(12) United States Patent
Rodoni

(10) Patent No.: US 10,115,289 B1
(45) Date of Patent: Oct. 30, 2018

(54) SENSOR SLEEVE FOR WASTE SERVICE VEHICLE

(71) Applicant: Rubicon Global Holdings, LLC, Atlanta, GA (US)

(72) Inventor: Philip Rodoni, Decatur, GA (US)

(73) Assignee: RUBICON GLOBAL HOLDINGS, LLC, Atlanta, GA (US)

( * ) Notice: Subject to any disclaimer, the term of this patent is extended or adjusted under 35 U.S.C. 154(b) by 0 days.

(21) Appl. No.: 15/635,815

(22) Filed: Jun. 28, 2017

(51) Int. Cl.
- *G08B 21/00* (2006.01)
- *G08B 21/18* (2006.01)
- *G01G 23/365* (2006.01)
- *G01L 5/00* (2006.01)

(52) U.S. Cl.
CPC ......... *G08B 21/182* (2013.01); *G01G 23/365* (2013.01); *G01L 5/00* (2013.01)

(58) Field of Classification Search
CPC ....... G08B 21/182; G01G 23/365; G01L 5/00
USPC ........................................................... 340/666
See application file for complete search history.

(56) References Cited

U.S. PATENT DOCUMENTS

| | | | | |
|---|---|---|---|---|
| 5,575,608 | A * | 11/1996 | Yau | B66F 9/12 414/607 |
| 8,330,059 | B2 * | 12/2012 | Curotto | G06Q 10/30 177/136 |
| 2010/0057593 | A1 * | 3/2010 | Moir | G01G 19/083 705/29 |
| 2017/0011364 | A1 * | 1/2017 | Whitman | B65D 21/086 |
| 2017/0261364 | A1 * | 9/2017 | Liang | G01G 3/1402 |

* cited by examiner

*Primary Examiner* — Kerri McNally
(74) *Attorney, Agent, or Firm* — Rock IP, PLLC

(57) ABSTRACT

A sensor sleeve is disclosed for a waste service vehicle having a lift arm. The sensor sleeve may have a shell configured to be received by the lift arm. The sensor sleeve may also have a sensor connected to the shell. The sensor may be configured to generate a signal indicative of a parameter of a waste receptacle loaded onto the lift arm.

20 Claims, 2 Drawing Sheets

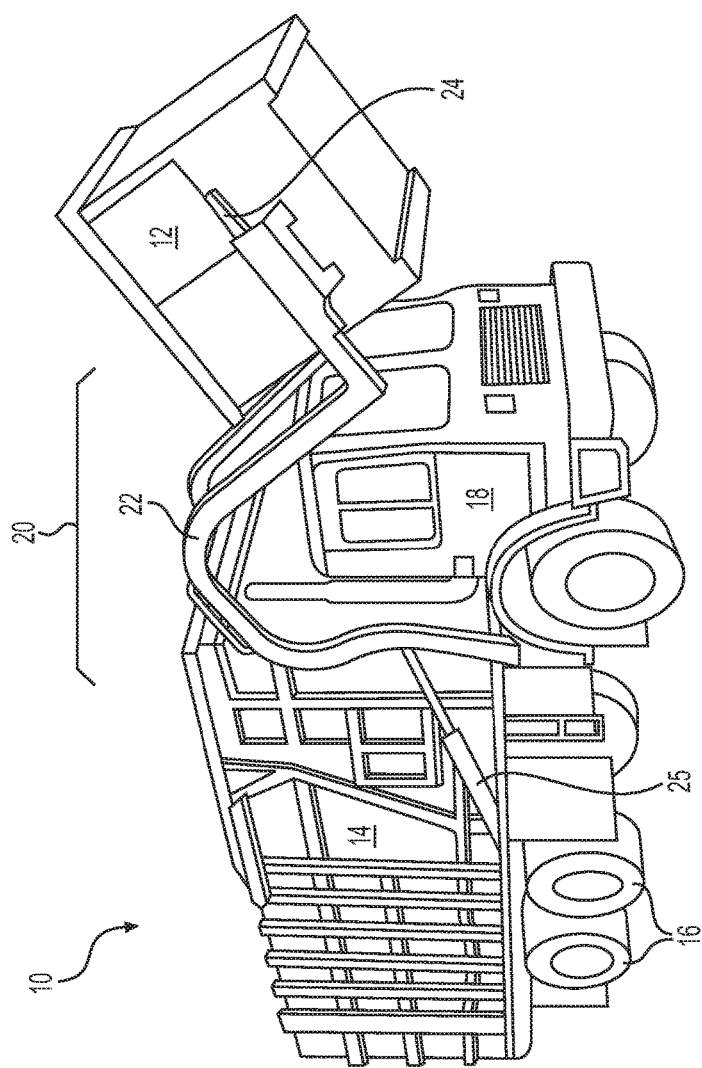
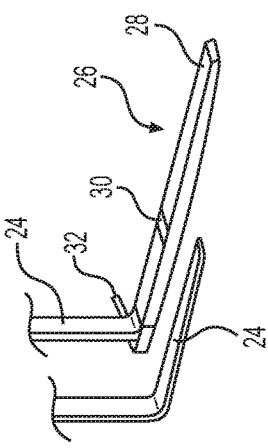

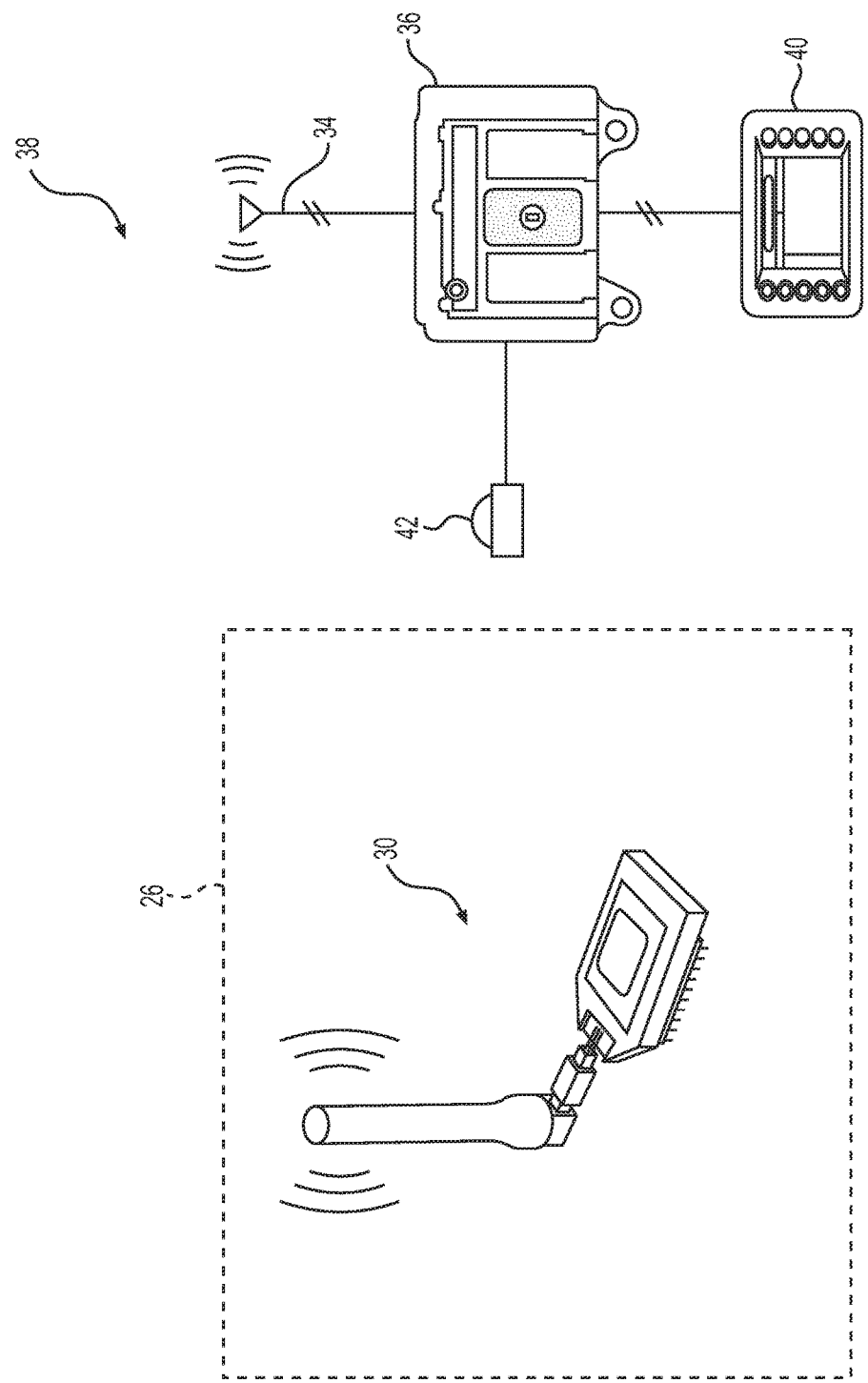

SENSOR SLEEVE FOR WASTE SERVICE VEHICLE

TECHNICAL FIELD

The present disclosure relates generally to a sleeve and, more particularly, to a sensor sleeve for a waste service vehicle.

BACKGROUND

Service vehicles have been used in the waste industry to collect waste from a receptacle (e.g., from a dumpster or a wheeled tote) and to transport the waste to a final disposition location. A conventional service vehicle includes forks or arms that extend forward, rearward, and/or to the side of a bed. The forks engage corresponding features (e.g., pockets or slots) formed in each receptacle, such that the receptacle can be lifted and dumped into the bed. In some embodiments, a hydraulic system is operatively connected to the forks, such that the forks and receptacle can be moved with reduced effort.

It can be important to gather information about the receptacle and/or the waste collected from the receptacle during servicing. For example, some service providers bill their customers based on an amount of waste (e.g., a weight of the waste) collected from each customer's receptacle. In another example, compliance with particular regulations (e.g., roadway regulations, emissions regulations, recycling regulations, hazardous waste regulations, etc.) requires that information be collected in association with waste discarded by particular customers and/or transported to particular final disposition locations. In these examples (and in other examples), the information is collected by way of one or more sensors associated with the service vehicle. For example, a strain gauge could be mounted in the bed of the service vehicle or to a strut supporting the bed and used to measure a change in payload of the service vehicle due service at a particular customer location. In another example, a pressure sensor could be associated with the hydraulic system that is connected to the forks of the vehicle and used to measure a change in hydraulic pressure associated with an engaged receptacle. Other types of sensors may also be used.

Although the sensors used in conventional waste service vehicles may be appropriate for some applications, they can also be expensive, difficult to maintain, and prone to damage. In particular, in some situations, the information provided by the sensors may only be needed periodically and/or at a start of service for a new customer. Thereafter, the sensors may be idle. In these situations, permanently connected sensors are an expensive accessory. In addition, permanently connected sensors may be difficult to access during maintenance, making their repair and replacement costly. Further, conventional sensors are hardwired to associated power sources and/or controllers, and caution must be taken to avoid damaging the wiring.

The disclosed sleeve is directed to overcoming one or more of the problems set forth above and/or other problems of the prior art.

SUMMARY

In one aspect, the present disclosure is directed to a sensor sleeve for a waste service vehicle having a lift arm. The sensor sleeve may include a shell configured to be received by the lift arm. The sensor sleeve may also include a sensor connected to the shell. The sensor may be configured to generate a signal indicative of a parameter of a waste receptacle loaded onto the lift arm.

In another aspect, the present disclosure is directed to another sensor sleeve. This sensor sleeve may include a shell forming at least a four-sided enclosure configured to temporarily receive a fork end of a lift arm. The sensor sleeve may also include at least one of a compression sensor and a strain gauge connected to the shell, being self-powered, and configured to wirelessly transmit a signal indicative of a load placed on the lift arm.

In yet another aspect, the present disclosure is directed to a system for monitoring waste collected by a service vehicle. The system may include a shell configured to be temporarily received by a lift arm of the service vehicle, and a sensor connected to the shell and configured to generate a signal indicative of a parameter of a waste receptacle engaged by the lift arm. The system may also include a display, and a controller located remote from the sensor and configured to receive the signal. Based on the signal, the controller may be further configured to cause a representation of an amount of waste collected by the service vehicle to be shown on the display.

BRIEF DESCRIPTION OF THE DRAWINGS

FIG. 1 is an isometric illustration of an exemplary disclosed waste service vehicle;

FIG. 2 is an isometric illustration of an exemplary disclosed fork arrangement for the waste service vehicle of FIG. 1; and FIG. 3 is a diagrammatic illustration of an exemplary disclosed control system that may be used in conjunction with the fork arrangement of FIG. 2.

DETAILED DESCRIPTION

FIG. 1 illustrates an exemplary waste service vehicle 10 that is configured to service a receptacle 12. The service may include, for example, the removal of waste materials from inside of receptacle 12, the removal of receptacle 12, and/or the placement of new or additional receptacles 12 at a particular customer location.

Service vehicle 10 may take many different forms. In the example shown in FIG. 1, service vehicle 10 is a hydraulically actuated, front-loading type of service vehicle. Specifically, service vehicle 10 may include a bed 14 supported by a plurality of wheels 16, a cab 18 located forward of bed 14, and a lifting device 20 extending forward of cab 18. Lifting device 20 may consist of, among other things, one or more lift arms 22 having a fork 24 at each end thereof that is configured to engage and/or grasp receptacle 12, and one or more actuators 25 connected to lift arms 22. Actuators 25 may be powered (e.g., by pressurized oil, pressurized air, and/or electricity) to raise lift arms 22 and receptacle 12 up past cab 18 to a dump location over bed 14. After dumping of receptacle 12 actuator(s) 26 may allow lift arms 22 and receptacle 12 to lower back to the ground in front of service vehicle 10.

In another example (not shown), service vehicle 10 may be a flatbed or roll-off type of service vehicle. Specifically, lifting device 20 may extend rearward of cab 18 and be powered to raise receptacle 12 up onto bed 14 for transportation of receptacle 12 away from the environment. After dumping of receptacle 12 at a landfill (or swapping of a full receptacle 12 for an empty receptacle 12), receptacle 12 may be returned to the service location and lowered back to the ground behind service vehicle 10. In other examples (not shown), lifting device 20 may be located to pick up receptacles 12 from a side of service vehicle 10. Other configurations may also be possible.

As shown in FIG. 2, a portion of lift arms 22 (e.g., one or more of forks 24) may be fitted with a sleeve 26. Sleeve 26 may include, among other things, a shell or housing 28 that is permanently or temporarily placed over or around fork 24, and at least one sensor 30 connected to (e.g., affixed to, imbedded within, or otherwise held by) shell 28. Shell 28 may be flexible (e.g., fabricated from an abrasion-resistant fabric such as Kevlar, Cordura, Ballistic nylon, or Gore Tex) or rigid (e.g., fabricated from metallic plates or a ceramic substrate), and configured to at least partially cover at least one surface of fork 24. In the disclosed example, shell 28 is configured to completely surround fork 24 (e.g., on four sides) and/or enclose fork 24 (e.g., on four sides and at a distal tip end). Shell 28 may be chemically bonded to fork 24 (e.g., via an adhesive—not shown), thermally bonded to fork 24 (e.g., via melting and/or welding), mechanically connected to fork 24 (e.g., via a mechanical fastener 32, such as a pin inserted at a base end, hooks-and-loops arranged along a length, zip ties, zippers, cordage, etc.), magnetically united, and/or joined to fork 24 in another manner.

Sensor 30 may be located anywhere inside of or on sleeve 26 and be configured to generate a signal indicative of a parameter of receptacle 12 and/or the waste contained within receptacle 12. In the disclosed example, sensor 30 is a compression sensor located within or on an upper panel of shell 28 and configured to generate a signal indicative of a pressure and/or force exerted by receptacle 12 on one or both of forks 24. In another example, sensor 30 is a strain gauge located within the upper panel, a side panel, and/or a lower panel of shell 28 and configured to generate a signal indicative of a deflection (e.g., bending) of the corresponding fork 24 when loaded by receptacle 12. It should be noted that by placing sensor 30 within the side and/or lower panel of shell 28, some protection from damage caused by engagement with receptacle 12 may be afforded. Other sensor types and locations may be used.

As shown in FIG. 3, sensor 30 may be a wireless sensor. For example, sensor 30 may be self-powered (e.g., include a battery and/or power generator—not shown) and be configured to wirelessly transmit the signal to a remotely located receiver 34 (e.g., to a receiver 34 associated with an onboard and/or offboard controller 36). The transmission could be based on one or more wireless proprietary protocol, such as NFC, Bluetooth, Wi-Fi (e.g., 802.11), cellular signals (e.g., GSM, CDMA, or LTE), satellite, etc.

Controller 36 may include means for monitoring, recording, storing, indexing, processing, interpreting, and/or communicating information based on the signals generated by sensor 30. These means may include, for example, a memory, one or more data storage devices, a central processing unit, or any other component that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

As also shown in FIG. 3, controller 36 may form a portion of a waste management system ("system") 38 that is configured to track, assist, and/or control movements of service vehicle(s) 10 (shown only in FIG. 1). In addition to controller 36, system 38 may also include a display 40 and a locating device 42. In some embodiments, controller 36, display 40, and/or locating device 42 are part of a mobile unit (e.g., a smartphone, a tablet, or a laptop), while in other embodiments, controller 36, display 40, and/or locating device 42 are part of a stationary unit (e.g., a cab-mounted console, a back office computer, etc.). Information regarding the waste retrieved by service vehicle 10 may be detected via sensor 30, interpreted by controller 36, and/or shown on display 40. In some instances, this information may be linked (e.g., by controller 36 and/or an operator of vehicle 10) to a particular customer location (e.g., based on a location detected by locating device 42, based on a manually input address, based on a receptacle identity, etc.).

In some embodiments, controller 36 may need to first filter and/or buffer the signal from sensor 30 prior to recording and/or displaying the information described above. In particular, controller 36 may be configured to utilize the signal generated by sensor 30 only when the signal has a value above a predefined threshold and/or within an expected range. For example, only when the signal indicates that at least a known weight of receptacle 12 (or at least a minimum amount greater than the known receptacle weight, for example at least 25 lbs. greater) has been loaded onto fork 24, will controller 36 record and/or cause the signal to be displayed. This may help to avoid errors in tracking the weight of collected materials (e.g., when sensor 30 generates signals associated with unintended collisions or vibrations of fork 24).

It is contemplated that display 40, in addition to showing sensory and locational information, could also be used to provide a way for an operator of service vehicle 10 to input observances made while traveling around the environment. For example, the operator may be able to enter a type and/or condition of waste observed at a particular location, an amount of waste in or around receptacle 12, a fill status of a particular receptacle 12, a condition of receptacle 12, a location of receptacle 12, a type of waste material being transported, an end-disposition location of the waste material, and/or other information about receptacle 12 and the waste engaged by, loaded into, or otherwise processed by service vehicle 10. The information may be input in any number of ways, for example via a touch screen interface, via one or more buttons, via a keyboard, via speech recognition, or in another manner known in the art.

Locating device 42 may be configured to generate signals indicative of a geographical position and/or orientation of service vehicle 10 relative to a local reference point, a coordinate system associated with a local waste environment, a coordinate system associated with Earth, or any other type of 2-D or 3-D coordinate system. For example, locating device 42 may embody an electronic receiver configured to communicate with satellites, or a local radio or laser transmitting system used to determine a relative geographical location of itself. Locating device 42 may receive and analyze high-frequency, low-power radio or laser signals from multiple locations to triangulate a relative 3-D geographical position and orientation. In some embodiments, locating device 42 may also be configured to determine a location and/or orientation of a particular part of service vehicle 10, for example of lift arms 22 (shown only in FIG. 1). Based on the signals generated by locating device 42 and based on known kinematics of service vehicle 10, controller 36 may be able to determine in real time, the position, heading, travel speed, acceleration, and orientation of service vehicle 10 and lift arms 22. This information may then be used by controller 36 to update the location and condition of service vehicle 10 and/or receptacles 12 in an electronic map or database of the environment.

It is contemplated that locating device 42 may take another form, if desired. For example, locating device 42 could be an RFID reader configured to interact with an RFID tag located within a surrounding environment (e.g., at a customer location, on receptacle 12, etc.), or another type of scanner configured to read another type of indicia (e.g., a barcode) within the environment. Based on the reading of the RFID tag or other indicia, the location and/or orientation of service vehicle 10 may be linked to the known location of the RFID tag or other indicia within the environment.

INDUSTRIAL APPLICABILITY

The disclosed sleeve and system may be applicable to the waste service industry, where service-monitoring can affect profitability and efficiency. The disclosed sleeve and system may be used together to automatically monitor an amount of waste collected by a service vehicle at a particular location and/or an amount of waste deposited by service vehicle at a particular location. The sleeve may be temporarily connected to a particular service vehicle, allowing for low-cost use with multiple different vehicles. In addition, because the sensor included in the sleeve may have wireless capabilities, longevity of the sleeve and system may be enhanced.

During operation, sleeve 26 may be temporarily or permanently associated with a particular service vehicle 10. For example, an open base end of sleeve 26 may be aligned with a distal tip end of fork 24, and then sleeve 26 may be pushed and/or pulled over fork 24 and slid into place. In some instances this may be all that is required to mount sleeve 26. In other instances, however, additional fastening may be required to retain sleeve 26 in its working location and orientation. For example, a chemical, mechanical, magnetic, and/or thermal means of fastening may need to be used, depending on a duration of intended use and/or expected operational parameters.

After sleeve 26 has been correctly assembled to fork 24, sensor 30 may be activated and paired with controller 36 (e.g., via receiver 34). Controller 36 may then receive signals generated and transmitted by sensor 30 during a waste service event; interpret the signals; analyze the signals; link the signals to locational information received from locating device 42; and/or cause the corresponding information to be shown on display 40.

It is contemplated that, other than sleeve 26 and sensor 30, the remaining components of system 38 may remain with the operator of service vehicle 10 and or with service vehicle 10 itself. That is, a particular sleeve 26 and associated sensor 30 may be the only components of system 38 that are transferred between service vehicles 10, and may be paired with any existing controller 36. This may allow for reduced cost associated with periodic waste audits, new customer setup, and other situations requiring only temporary monitoring of collected waste.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A sensor sleeve for a waste service vehicle having a lift arm, comprising:
    a locating device including a scanner configured to scan a receptacle and generate a first signal based on the scanning;
    a shell configured to be received by the lift arm; and
    a sensor connected to the shell and coupled to a controller and the locating device, the sensor configured to generate a second signal,
        the controller being configured to:
            determine a first location of the waste service vehicle based on the first signal from the scanner; and
            correlate an amount of waste collected by the waste service vehicle at the first location based on the second signal.

2. The sensor sleeve of claim 1, wherein the shell is configured to surround the lift arm on four sides.

3. The sensor sleeve of claim 1, wherein the shell is configured to surround the lift arm on five sides.

4. The sensor sleeve of claim 1, further including a fastener configured to retain the shell on the lift arm via at least one of a chemical bond, a thermal bond, a mechanical bond, and a magnetic bond.

5. The sensor sleeve of claim 1, wherein the sensor is self-powered.

6. The sensor sleeve of claim 1, wherein the sensor is configured to wirelessly transmit the signal.

7. The sensor sleeve of claim 6, wherein the sensor is configured to wirelessly transmit the signal via Bluetooth.

8. The sensor sleeve of claim 1, wherein the sensor is a compression sensor located in an upper panel of the shell.

9. The sensor sleeve of claim 1, wherein the sensor is a strain gauge located in at least one of a side panel and a lower panel of the shell.

10. The sensor sleeve of claim 1, wherein the shell is flexible.

11. The sensor sleeve of claim 1, wherein the sensor is configured to pair with an existing controller located onboard the waste service vehicle.

12. A sensor sleeve, comprising:
    a locating device including a scanner configured to scan a waste receptacle and generate a first signal based on the scanning;
    a shell forming at least a four-sided enclosure configured to temporarily receive a fork end of a lift arm;
    at least one of a compression sensor and a strain gauge connected to the shell, being self-powered, and configured to wirelessly transmit a signal indicative of a load placed on the lift arm; and
    a controller coupled to the locating device and the at least one of a compression sensor and a strain gauge, and configured to:
        determine a first location of the waste service vehicle based on the first signal from the scanner; and
        correlate an amount of waste collected by the waste service vehicle at the first location based on the second signal.

13. A system for monitoring waste collected by a service vehicle, comprising:
    a locating device including a scanner configured to scan a waste receptacle and generate a first signal based on the scanning;
    a shell configured to be temporarily received by a lift arm of the service vehicle;
    a sensor connected to the shell and configured to generate a second signal;
    a display; and
    a controller coupled to the locating device and the sensor and configured to:

determine a first location of the waste service vehicle based on the first signal from the scanner; and correlate an amount of waste collected by the waste service vehicle at the first location based on the second signal.

14. The system of claim 13, wherein the controller is further configured to cause a representation of the amount of waste collected by the service vehicle to be shown on the display only when the signal indicates that at least a threshold amount of weight has been loaded onto the lift arm.

15. The system of claim 14, wherein the threshold amount of weight is a known weight of the waste receptacle.

16. The system of claim 14, wherein the threshold amount of weight is a minimum amount of weight greater than a known weight of the waste receptacle.

17. The system of claim 13, wherein the first signal is indicative of a location of the waste receptacle during servicing, wherein the controller is further configured to link the signal from the sensor to the location of the waste receptacle during servicing.

18. The system of claim 13, further including a fastener configured to retain the shell on the lift arm via at least one of a chemical bond, a thermal bond, a mechanical bond, and a magnetic bond.

19. The system of claim 13, wherein the sensor is self-powered and configured to transmit the signal to the controller wirelessly.

20. The system of claim 13, wherein the sensor is one of a compression sensor located in an upper panel of the shell sleeve, and a strain gauge located in at least one of a side panel and a lower panel of the shell sleeve.

* * * * *